United States Patent [19]

Bartolomei et al.

[11] Patent Number: 5,709,902
[45] Date of Patent: Jan. 20, 1998

[54] METHOD FOR PREPARING A SUGAR COATED R-T-E CEREAL

[75] Inventors: Carla Helou Bartolomei, Edina; Richard D. Thesing, Monticello, both of Minn.

[73] Assignee: General Mills, Inc., Minneapolis, Minn.

[21] Appl. No.: 354,563

[22] Filed: Dec. 13, 1994

[51] Int. Cl.[6] .................................................. A23L 1/18
[52] U.S. Cl. ........................... 426/620; 426/94; 426/293; 426/302; 426/307; 426/549; 426/559; 426/560; 426/619; 426/621
[58] Field of Search ............................... 426/620, 621, 426/94, 302, 307, 549, 293, 619, 559, 560

[56] References Cited

U.S. PATENT DOCUMENTS

| | | | |
|---|---|---|---|
| 1,989,480 | 1/1935 | Kellogg | 426/621 |
| 1,990,382 | 2/1935 | Kellogg | 426/621 |
| 2,196,395 | 4/1940 | Kellogg | 426/307 |
| 2,333,442 | 11/1943 | Rex | 426/307 |
| 2,788,277 | 4/1957 | Huber | 426/621 |
| 3,484,250 | 12/1969 | Vollink et al. . | |
| 3,557,718 | 1/1971 | Chivers | 426/620 |
| 3,578,459 | 5/1971 | Corbin . | |
| 3,582,336 | 6/1971 | Rasmusson . | |
| 3,595,670 | 7/1971 | Maloney et al. . | |
| 3,723,131 | 3/1973 | Bixby et al. | 426/94 |
| 3,798,338 | 3/1974 | Galle . | |
| 3,840,685 | 10/1974 | Lyall et al. | 426/307 |
| 3,868,471 | 2/1975 | Decelles et al. | 426/307 |
| 3,876,811 | 4/1975 | Bonner et al. | 426/307 |
| 3,959,498 | 5/1976 | Lyall et al. . | |
| 3,976,793 | 8/1976 | Olson et al. | 426/302 |
| 4,038,427 | 7/1977 | Martin . | |
| 4,061,790 | 12/1977 | Cole, Jr. . | |
| 4,211,800 | 7/1980 | Scharschmidt et al. . | |
| 4,251,551 | 2/1981 | Van Hulle et al. | 426/94 |
| 4,409,250 | 10/1983 | Van Hulle et al. | 426/94 |
| 4,594,252 | 6/1986 | Niemczyk | 426/307 |
| 4,880,645 | 11/1989 | Carpenter et al. | 426/307 |
| 4,963,373 | 10/1990 | Fan et al. . | |
| 4,988,521 | 1/1991 | Fan . | |
| 5,176,936 | 1/1993 | Creighton et al. | 426/620 |
| 5,182,127 | 1/1993 | Schwab et al. | 426/621 |
| 5,196,218 | 3/1993 | Schwab et al. | 426/621 |
| 5,198,255 | 3/1993 | Schwab et al. | 426/621 |
| 5,200,222 | 4/1993 | Schwab et al. . | |
| 5,258,189 | 11/1993 | Efstathiou | 426/302 |
| 5,338,556 | 8/1994 | Schwab et al. . | |
| 5,372,826 | 12/1994 | Holtz et al. | 426/621 |

*Primary Examiner*—Lien Tran
*Attorney, Agent, or Firm*—John A. O'Toole; L. MeRoy Lillehaugen

[57] ABSTRACT

A method for preparing a sugar coated R-T-E cereal product. The method comprises the steps of applying a high moisture sugar slurry to a wet cereal base to form a slurry coated wet cereal base and thereafter toasting the slurry coated wet cereal base under conditions of, for at least a portion of the drying step, elevated temperature (>250° F., 121° C.), e.g., toasting to form the sugar coated R-T-E cereal. By applying the diluted slurry to the wet cereal base and then toasting, the conventional final slurry drying step is eliminated. Also, the sugar coated cereal exhibits superior flavor and crispness in milk resulting from the formation of a "crust" layer in the R-T-E cereal piece. The R-T-E cereal exhibits improved shelf life compared to an uncoated R-T-E cereal.

9 Claims, 1 Drawing Sheet

METHOD FOR PREPARING A SUGAR COATED R-T-E CEREAL

FIELD OF THE INVENTION

The present invention relates to food products and to methods for their preparation. More particularly, the present invention relates to sugar coated R-T-E cereal and to their methods of preparation.

BACKGROUND

Ready-to-eat ("R-T-E") breakfast cereals are popular packaged food items. R-T-E cereals exist in large numbers of varieties including puffed and unpuffed, regular or pre-sweetened (e.g., sugar coated), and including a wide variety of cereal compositions.

Most R-T-E cereals may be grouped into two broad categories, puffed and unpuffed cereals. Unpuffed cereals include 1) flaked cereals (e.g., corn flakes, wheat flakes, rice flakes, mixed grain flakes), and to a lesser extent, 2) shreds (whether from whole grains or from cooked cereal doughs), 3) biscuits, including filled or unfilled, 4) shredded biscuits, including filled and unfilled, and 5) granola cereals.

The preparation of each of these unpuffed cereal types optionally or essentially comprise a toasting operation. For example, typically, the preparation of flaked cereals essentially comprise toasting the flakes. Conventionally, R-T-E cereal flakes are toasted and dried by oven toasting wet cereal flakes to form toasted dry flakes having a moisture content of 5%>. Flake toasting ovens generally include rotating beds flushed with hot air which gently and evenly toasts the flakes. Flake toasting can also be done by fluidized bed hot air heating or by circulating hot air through the flakes on a belt or conveyor. The toasting step generally causes a modest increase in volume (e.g., a one- to two-fold or "1-2X" increase) and for this reason this finish step is sometimes referred to as a toasting and puffing step. A flake cereal is usually tenderized, toasted and partially expanded by rapid heating which converts the dense, hard flakes into more palatable, porous, tender flakes. The toasting operation also enhances the color and flavor of the finished cereal product. The cereal pieces are toasted, preferably between about 250° and about 600° F. (121° to 351° C.) for about 0.2 to 10 minutes (20 sec. to 5 min.) or until a moisture content of approximately 2% to 5% is obtained. Toasting of the formed R-T-E cereal pieces can be practiced in conveyor dryers, vacuum dryers, or other commercial baking equipment.

In the commercial preparation of sugar coated flake R-T-E cereals, the toasted flake cereal is next charged to a rotating enrober and a concentrated hot sugar syrup or sugar slurry added (e.g., with 1% to 5% oil). The flakes and sugar syrup are tumbled until the flakes are evenly coated with the sugar syrup. Thereafter, the syrup coated flakes are fed to a second or finish dryer wherein the residual moisture added with the sugar syrup is removed bringing the moisture content once again to a stable range of about 5%>.

A sugar coating is added since incorporation of large amounts of sugar into the cereal composition from which the cereal flake is fabricated adversely affects numerous cereal piece attributes. Also, the sugar coating adds to the bowl life of the sugar coated product and improves the desirable crispy flavor.

While useful and widely practiced, one problem with this conventional post toasting sugar syrup application preparation technique is the generation of cereal fines. Cereal fines are small pieces of cereal material resulting from the breakage of the cereal flakes. Cereal fines are highly unpopular with consumers. Typically, cereal fines are screened out during one or more points in the manufacturing process. While cereal fines often are recaptured for reuse, some fines cannot be reused. Cereal fines, of course, reduce the overall yield of the cereal manufacturing line. While any yield loss is undesirable, yield losses are particularly undesirable when they occur late or downstream in the process after expensive prior processing has already been applied to the cereal material and occurs in the almost finished product.

Some cereal fines are generated during the sugar syrup enrobing step. Additional cereal fines are created during the finish drying step. Collectively, between these steps, fines generation can run about 4% to 7% of the cereal flakes. The preparation of presweetened puffed R-T-E cereals can also result in some cereal fines generation. However, due to the structure and fragility of flaked R-T-E cereals, the problem for flake cereal processing is more severe.

Still another problem in the R-T-E cereal art lies in the provision of an R-T-E cereal having a desirable crunchy, crisp texture. Increasingly, R-T-E cereals are consumed as snack foods particularly in countries where adult consumption of milk products is uncommon. It is desirable to provide a cereal piece having a crunchy texture without deep fat frying.

Still another problem resides in the provision of an R-T-E cereal that retains its desirable crisp texture for extended times after being added to milk. This feature is sometimes referred to as bowl life. A wide variety of techniques have been taught in the art for increasing bowl life. In particular, it is known that sugar coated R-T-E cereals enjoy bowl lives that are longer than regular R-T-E cereals. For R-T-E cereals having a given or specified quantity of sugar coating, the challenge is to provide the maximum bowl life for a particular level of sugar coating.

In view of the state of the art, there is a continuing need for improvements in the R-T-E cereal processing art for preparing sugar coated R-T-E cereals that provide reductions in the amount of yield losses resulting from cereal fines generation.

Accordingly, it is an object of the present invention to provide improved methods for R-T-E cereal production that minimize cereal fines generation.

Still another object of the present invention is to provide methods for applying a sugar syrup or slurry for the production of sugar coated R-T-E cereal which exhibit increases in crispness or bowl life relative to uncoated products.

A further object of the present invention is to provide improved R-T-E cereals and methods for their preparation for the production of sugar coated R-T-E cereals that exhibit enhanced crunchiness upon consumption without milk.

Still another object of the present invention is to provide methods for cereal processing which can be readily practiced in present commercial cereal processing plants without requiring extensive modification of existing cereal processing methods or equipment.

Another object of the present invention is to provide cereal processing method improvements which can reduce the cost of cereal processing by reducing plant equipment.

Another object of the present invention is to provide cereal processing methods which can provide improvements in efficiencies by reducing product breakage.

Another object of the present invention is to provide an R-T-E cereal having an encrusted flake that exhibits increased toasted flavor.

Surprisingly, the above objects can be realized and the present invention provides methods for decreasing fines generation and for imparting improvements in bowl life for presweetened R-T-E cereals. The present invention comprises the steps of applying a diluted sugar slurry to a wet cereal flake or piece to form a slurry coated wet cereal flake or piece and thereafter toasting the slurry coated wet cereal flake or piece to form the sugar coated R-T-E cereal. By applying the diluted slurry to the wet cereal flake and then toasting using conventional hot air ovens, the conventional final sugar syrup drying step is eliminated. Also, the sugar coated R-T-E cereal exhibit superior flavor and crispness in milk resulting from the formation of a "crust" layer in the R-T-E cereal piece.

SUMMARY OF THE INVENTION

In its method aspect, the present invention resides in methods comprising the essential characterizing steps of applying a high moisture sugar slurry to a wet cereal flake or piece to form a slurry coated wet cereal flake or piece and thereafter drying the slurry coated wet cereal flake or piece to form the sugar coated R-T-E cereal. By applying the diluted slurry before toasting to the wet cereal flake and then thereafter toasting, the conventional final slurry drying step can be eliminated. Also, the sugar coated R-T-E cereal exhibits superior flavor and crispness in milk resulting from the formation of a "crust" layer in the R-T-E cereal piece. The sugar syrup coating has a moisture content of about 35% to 76%. The wet cereal base has a moisture content of about 12% to 20%.

In its product aspect, the present invention provides R-T-E cereals, especially flaked, exhibiting improved bowl life relative to other presweetened R-T-E cereals having comparable levels of a sweetener coating relative to uncoated R-T-E cereals. The R-T-E cereal is characterized by an outer, sugar infused crust layer.

DETAILED DESCRIPTION OF THE INVENTION

Figure 1:
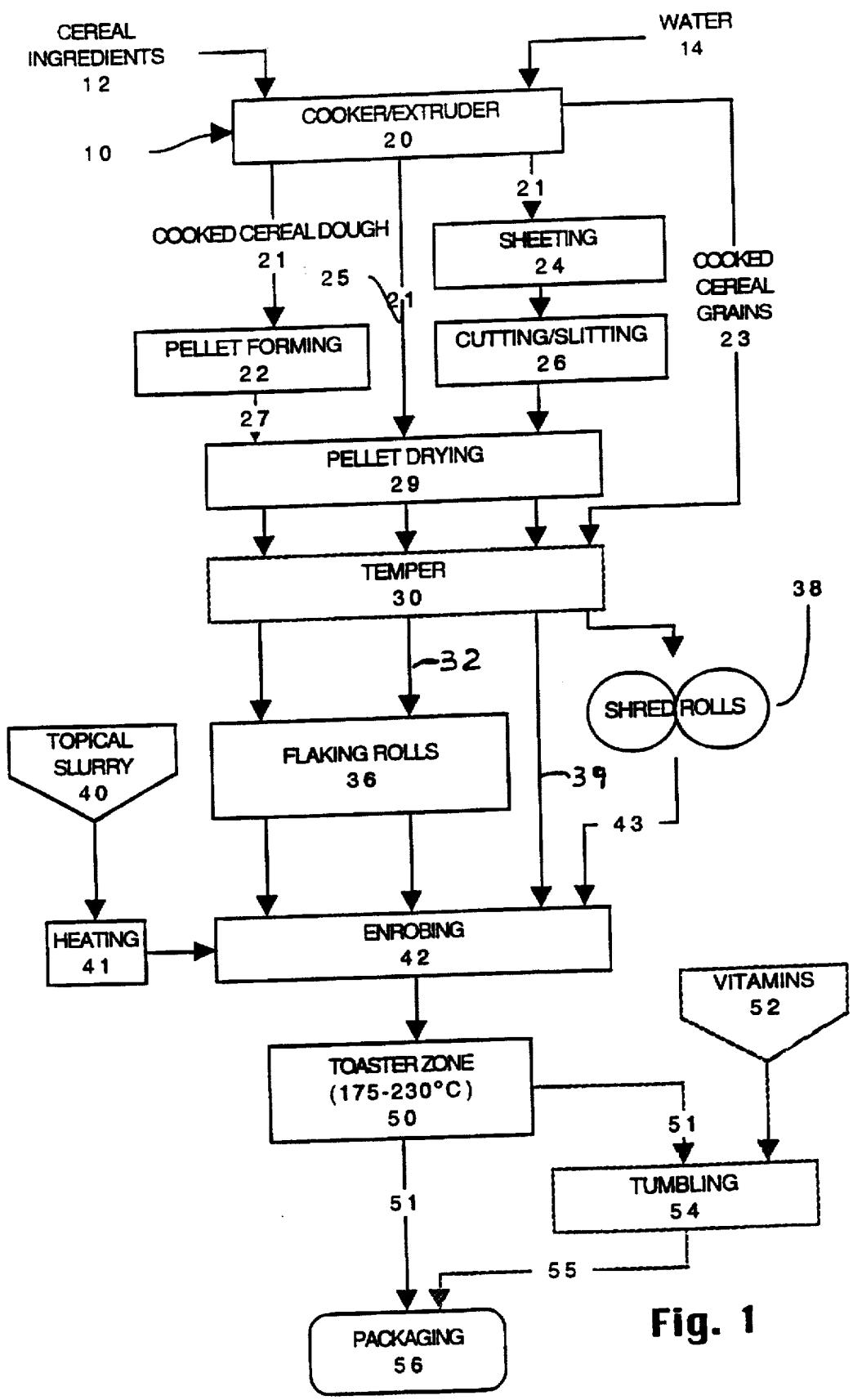
FIG. 1 is a simplified flow diagram of the present process with optional steps and variations in steps indicated with dotted lines.

The present invention provides improved sugar coated R-T-E cereal and improved R-T-E cereal processing methods for preparing such improved R-T-E cereal products. The present methods involve applying a diluted sugar syrup or slurry to a wet cereal flake or piece to form a slurry coated wet cereal flake or piece and thereafter toasting the slurry coated wet cereal flake or piece to produce the finished R-T-E cereal product. The methods of the present invention are described in detail below.

Throughout the specification and claims, percentages are by weight and temperatures in degrees Fahrenheit unless otherwise indicated.

A. Providing A Cereal Base

Referring now to the drawing, FIG. 1 shows a highly schematic flow diagram of a highly preferred embodiment of the present method referred to generally by reference numeral 10. As there illustrated, the present method includes an essential initial step 42 of applying a dilute sugar syrup 40 to or enrobing onto an R-T-E cereal base.

The cereal base can comprise a wide variety of shapes, densities, sizes and compositions. For example, the cereal base comprises a plurality of individual pieces of wet unexpanded R-T-E cereal compositions such as wet flakes 32, shreds 43, wet sheeted dough pellets 39 or other cooked cereal pieces (not shown) such as biscuits, granola, and mixtures thereof. Preferred for use herein as the cereal base are wet untoasted cereal pellets having a moisture content of about 12% to 25%, preferably about 16% to 20%. The present invention finds particular suitability for use in connection with wet R-T-E cereal flakes. The term "flakes" is used to refer to a piece formed by flaking a cooked cereal pellet or grain or grain fragment. Wet flakes typically range in thickness from about 350 to 900 μm (0.015 to 0.035 in.) in thickness.

Less preferred for use herein are puffed cereal base pieces since such pieces have previously been finished dried to about 2% to 6% moisture by the puffing process. The term "puffed cereal pieces" is used herein in its conventional usage to refer to relatively larger, low density base pieces having a density ranging from about 0.06 to 0.15 g/cc (4.3 to 10 oz per 124 inch$^3$) preferably about 0.09 to 0.14 g/cc (5 to 10 oz per 124 inch$^3$). However, certain puffed pieces, e.g., oat based puffed "O's" are conventionally toasted after puffing and, in certain embodiments, thereafter sugar coated and dried. The present invention can be used to accomplish the toasting and sugar coating. The present invention can be practiced using dried flakes as the cereal base but are not preferred since the primary advantages of the present invention are unobtained.

This essential step can comprise any of a variety of substeps which result in the provision of a suitable wet cereal base. In the conventional preparation of an R-T-E cereal, a dry blend of starchy cereal ingredients 12 with or without a bran or fiber constituent is well mixed and then combined with water 14 and minor amounts of other conventional R-T-E cereal ingredients such as salt(s), sugar(s), malt or other flavors and starches and mixing with heat to cook or gelatinize the starchy component of the cereal composition such as in a cooker 20. The gelatinized or cooked cereal upon further mixing forms a cooked farinaceous dough 21. A variety of well known cooking methods and equipment can be used to prepare a cooked cereal dough. For example, the wetted cereal blend can be processed in a short cook time cooker extruder 20 (e.g., a single or twin screw extruder) or in an extended cook time cooker such as a pressurized and agitated steam cooker each of which form the cooked cereal dough 21 which in turn can be fed to a cereal pellet forming extruder 22 to form cereal pellets 27. In another variation 25, the cooking and dough forming steps are performed simultaneously in a high pressure, cooker extruder equipped with a pellet-forming diehead. The cooked cereal dough pellets so formed typically range from about 18% to 30% moisture.

In another variation, the cooked cereal dough 21 is formed into a dough sheet by sheeting 24 which sheet is then sectioned, e.g., longitudinally cutting and transversely sheeting to form pellets in sheet form 26. The pellets can then be dried 29 in a conventional pellet dryer and optionally tempered 30 such as in a temper bin to adjust or equilibrate the moisture content for further processing.

In another variation, cooked whole cereal grains 23 are tempered 30 and thereafter are shredded in shredding rolls 38 to form wet cereal shreds 43. In a further variation (not illustrated) the shreds can be laminated or otherwise arranged or formed into biscuits of various sizes to form the cereal base. In another variation, the shredded cereal is formed into layers to form a shredded cereal biscuit. In even more particular shredded cereal embodiments, the shredded biscuits are filled such as with a fruit filling or a confection (e.g., a water based icing composition).

In another embodiment (not illustrated) the cereal base is a puffed cereal. Pellets having a moisture content of about 10% to 14% can be puffed such as by a conventional puffing gun 32 to form a puffed R-T-E cereal base, especially oat based pieces in the form of rings or other compositions in the form of spherical puffed cereal pieces. The puffed base cereal pieces exit the puffing gun at a moisture content of about 6%. The puffed oat cereal can optionally then be toasted prior to application of a sugar slurry. In the conventional technique for the production of presweetened as well as flavored or bit coated, the puffed pieces are charged directly to an enrober at their exiting 6% moisture content and are then tumbled and dried and thus coated with the topical coating materials. As part of the coating operation, the moisture content is reduced to the required 3% levels. In still other variations (not shown), the puffed pieces are prepared without an intermediate pellet forming step by direct expansion at the diehead of a cooker extruder, e.g., a twin screw cooker extruder.

Of course, within this general outline of cereal processing, a wide variety of particular methods and variations can be used. In the production of an R-T-E cereal, various general procedures are used depending upon the desired form, type or condition of the final product.

The present invention is particularly suitable for use in connection with a whole wheat based, flaked R-T-E cereal. In this preferred embodiment, the wet flake cereal base 32 formed by flaking rolls 36 is fabricated from a gelatinized cereal composition having the following formulation:

| Ingredient | Weight % | Preferred Weight % |
|---|---|---|
| Whole wheat flour | about 40 to 90% | 65 to 85% |
| Salt | 0.1 to 2.5% | 1 to 2.5% |
| Wheat Starch | about 0.1 to 20% | 2.5 to 7.5% |
| Supplemental cereal ingredients | about 0.1 to 40% | 0.5 to 15% |
| Sugar(s) | 0.1 to 10% | 1 to 7% |

The cereal composition can be cooked to form a cooked cereal dough, formed into pellets, tempered and flaked to form wet whole wheat cereal flakes having a moisture content of about 16% to 20%.

Applied to the wet cereal flakes 37 is a dilute presweetener coating composition or "sugar slurry" as referred to in the art. The term "sugar slurry" is used in the art as a general collective term that includes both sugar syrups (i.e., no solids or oil components) as well as other compositions that include an oil component, whether or not emulsified, and/or solids. Well known presweetener coating application techniques can be employed both for the diluted sugar coating or slurry. Generally, such sugar syrups comprise:

| Ingredient | Weight % | Preferred Range |
|---|---|---|
| Sucrose | 20 to 50% | 25 to 35% |
| Corn syrup | 0 to 30% | 10 to 20% |
| Oil | 0 to 25% | 5 to 15% |
| Moisture | 35 to 75% | 40 to 60% |

Such sugar syrups are dilute relative to conventional sugar syrups which generally contain about 9% to 15% moisture. The art teaches away from employment of dilute sugar syrup and towards more concentrated syrups since all added moisture in the syrup must be subsequently removed by a drying step using expensive drying equipment. Indeed, many commercial R-T-E cereal lines are rate limited by the capacity of the final drying equipment. Therefore, addition of twice the amount of added water can significantly reduce throughputs.

In other variations, optionally, the presweetener coating solution additionally comprises about 0.1% to 15% of a flavor constituent and/or vitamins. The addition of a flavor constituent to the sugar coating solution can be to augment flavor development or to compensate for flavor losses that can occur from the toasting step(s) practiced herein. These steps, due to their heat application, tend to drive off the volatile flavor constituents leading to flavor degradation or loss. Heat tolerant high potency sweeteners can also be used (e.g., acetylsulfame K). However, heat sensitive high potency sweeteners (e.g., aspartame) should not be used exclusively since the rigorous high temperatures of the subsequent drying step can cause degradation of these expensive high potency sweeteners. The vitamins selected should preferably be heat tolerant. A particularly useful combination of vitamins for topical application consist of vitamins C, A and D and mixtures thereof. In another variation, the sugar solution can additionally comprise about 1% to 20% of a reaction flavor ingredient. Such a reaction flavor ingredient reacts due to the elevated temperature of the toasting step. The reaction can be with the other sugar coating ingredients or with the cereal piece itself. Exemplary reaction materials include non-fat dry milk solids, malt and other grain syrups. Other suitable reaction flavors are commercially available from various flavor ingredient suppliers.

In certain other embodiments (not shown), the coating syrup 40 can also include or be co-applied with particulates such as fruit and nut pieces and/or small cereal grain flakes. The coating step 41 can be practiced to evenly coat the exterior of the cereal base 32 or to be selectively deposited in recesses in known manner. (See, for example, U.S. Pat. No. 4,539,211 entitled Process For Manufacturing Cavity-Filled Cereal Pieces, issued Sep. 3, 1985 to Armando et al. which is incorporated herein by reference.)

The amount of sugar coating to cereal base ranges from about 0.01 to 0.2:1 dry basis, preferably about 0.015 to 0.125:1, and for best results about 0.035:1.

B. Toasting/Drying the Sugar Syrup Coated Cereal Base

The present methods 10 further essentially comprise the characterizing step of subsequently drying 44 the sugar syrup coated wet cereal base to form the finished cereal such that during at least a portion of the drying step, the external surface of the coated R-T-E cereal pieces reach a temperature of $\geq 250°$ F. ($\geq 121°$ C.). The present drying step 50 can be practiced by or comprise toasting, baking or other steps involving moisture reduction at such elevated temperatures. It is important for the formation of the desirable sugar crust feature herein that the temperature gradient be such that the higher temperature is external to the piece. Thus, high intensity microwave heating techniques which create a reverse or internal gradient are not suitable for use herein since the desired external crust layer would not be formed.

The present drying step is to be distinguished from a mere drying step on the basis of the final temperature achieved or experienced by the R-T-E cereal base pieces. Of course, during the practice of the present elevated temperature drying step the coated wet cereal base will lose moisture and the wet cereal base will be dehydrated. The present elevated temperature drying step essentially comprises a heating step wherein the exterior R-T-E cereal base surface reaches a temperature of at least ≧250° F. (≧121° C., for example >135° C.) for at least a portion of the toasting step to allow for toasting reactions to take place in the cereal piece. The elevated temperature reached by the cereal piece preferably occurs when the cereal piece has been dried to a moisture content of less than 10%, preferably 8%<. In preferred embodiments, the elevated temperature drying step comprises a toasting step, i.e., employing a toaster having a temperature of ≧400° F. (≧200° C.).

If desired, the present elevated drying step can include a predrying substep prior to the high temperature or toasting substep. The drying step includes the substeps of initial drying with forced hot air having a temperature of about 350 to 475 degrees F. to an intermediate moisture of about 6% to 10% and final drying with forced hot air having a temperature of about 275 to 375 degree F. to a moisture content of 1% to 6%.

The elevated temperature or toasting step is continued until the wet cereal pieces obtain a finish moisture content of about 1% to 6%, preferably about 2% to 4%.

If desired, the dried R-T-E cereal pieces 51 can be thereafter fortified with an exterior or topical application of heat sensitive vitamins. A vitamins dispersion 52 is topically added to the cereal base 51 such as by tumbling 54 to form a vitamin fortified finished presweetened R-T-E cereal. Of course, the topical application of beta carotene is less preferred for the stability and appearance concerns discussed herein. Vitamin C beta carotene and other heat labile vitamins can optionally be sprayed onto the cereal pieces after the drying step 30.

After finish toasting, the sugar coated and toasted pieces 51, optionally vitamin fortified 55, are allowed to cool to ambient temperature and then subsequently packaged 56 and distributed in conventional manner. No further drying is required since the amount of added moisture from topical vitamin application is small.

The skilled artisan will appreciate that the present toasting step not only toasts, puffs and tenderizes the wet cereal flake but also serves as the finish dryer for the sugar syrup drying step. Such a process thus allows for the elimination of a dryer compared to the conventional method and sequence of steps and the high capital costs associated with this drying.

Still another surprising advantage of the present invention is that the present R-T-E cereals exhibit unexpected increases in bowl life relative to other R-T-E cereals having equivalent levels of sugar coating.

Another advantage is a reduction in the cereal fines generated in the cereal manufacturing process.

Still another advantage is that the bulk density is lower for the present products compared to otherwise similar sugar coated flake cereals that are conventionally prepared due to reductions in the shrinkage of the flakes that occur when toasted flake cereals are sugar coated.

Still another advantage is that the present cereal flakes have a lower percentage of broken flakes compared to sugar coated flakes that are conventionally prepared.

Industrial Applicability

The present invention finds particular suitability for the commercial preparation of presweetened ready-to-eat cereals.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of the R-T-E cereal art, can be undertaken without departing from the spirit and scope of the invention.

EXAMPLE 1

A flake wheat R-T-E cereal of the present invention having a sugar infused crust layer is prepared having the following formulation:

| Ingredients | Weight % | |
|---|---|---|
| Wheat (13% moisture) | 70.00 | |
| Sugar syrup | 30.00 | |
| Water | | 19.5 |
| Sugar | | 7.8 |
| Salt | | 1.2 |
| Sugar syrup (corn syrup) | | 1.2 |
| Trisodium phosphate | | 0.3 |
| | 100.00 | 30.0% |

The wheat is placed into a pressurized cooker with the sugar syrup, heated to about 170° to 180° F. (77° to 82° C.) and cooked with water in the batch cooker under pressures of about 20–28 psig (120 to 170 KPa) for 60 minutes. Following cooking, the cereal grain mass is tempered for approximately four hours and obtains an average moisture of 28% to 34%. Following tempering, the cereal grain mass is conveyed to a screw conveyor and mixed to form cooked cereal dough.

The cooked cereal dough is then fed to a pellet former which forms the cooked cereal mass into a dough and forms the dough into pellets. The pellets are next air dried to a moisture content of about 20%. The dried pellets are next flaked to form wet flakes having a moisture content of about 18%. The wet flakes are enrobed with a sugar slurry having the following formulation:

| Ingredients | Weight % |
|---|---|
| Sucrose | 34.00 |
| Corn syrup | 22.00 |
| Moisture | 44.00 |
| | 100.00% |

About 6 g of the slurry were added per 100 g of wet flakes to form coated wet cereal flakes. The sugar slurry was preheated to about 150° F. (66° C.) prior application to the wet cereal flakes.

The coated wet cereal flakes were dried at a bed depth of about 2 cm in a fluidized toasting oven at 232° C. for about one to three minutes and are dried to a moisture content of about 2.5% to form finished dried coated R-T-E cereal flakes of the present invention.

The finished R-T-E cereal flakes are then further vitamin fortified with heat labile vitamins A, D, and C by an aqueous dispersion. The vitamins are added to the flakes in an enrober to obtain a vitamin fortified finished product having about 3% moisture. The vitamin fortified finished whole wheat flaked R-T-E cereal is then conventionally packaged and distributed.

Finished R-T-E cereal products of the present invention are obtained when the wheat flakes are substituted with an equivalent amount of corn flakes, mixed grain flakes, bran flakes, oat flakes and mixtures thereof.

In another variation, the above sugar slurry is substituted with a sugar slurry having the following formulation:

| Ingredients | Weight % |
| --- | --- |
| Sucrose | 23.00 |
| Vegetable oil | 16.00 |
| Water | 48.00 |
| Sugar syrup/flavors | 13.00 |
| | 100.00% |

The sugar coated flakes are then dried/toasted to form whole wheat toasted flaked cereal pieces having a moisture content of about 2.5%.

The finished R-T-E cereals are characterized by having an improved toasted flavor and by an increased bowl life relative to an uncoated cereal flake.

EXAMPLE 2

An R-T-E puffed cereal of the present invention having a sugar infused crust layer is prepared having the following formulation:

| Puffed Untoasted O's | |
| --- | --- |
| Ingredients | Weight % |
| Oats | 75.00 |
| Wheat starch | 20.00 |
| Sugar | 1.00 |
| Salt | 2.50 |
| Trisodium phosphate | 1.50 |
| | 100.00% |

The oats and other ingredients are fed to a continuous, pressurized, agitated cooker with water and are then mixed with heat to cook and gelatinize the starchy component of the cereal composition. Upon mixing and heating for two hours, the gelatinized cereal forms a cooked farinaceous dough. The dough is then in turn fed to a cereal pellet forming extruder that forms shaped pellets such as rings or "O's." The cooked cereal pellets have a moisture of approximately 25%. The cereal pellets are then passed through a pellet dryer to reduce the moisture of the pellets to approximately 18%. The pellets are then sent through a puffing gun which expands and dries the cereal piece to a density of approximately 0.10 g/cc and a moisture of 6% to form a puffed cereal base.

The puffed cereal base pieces are then enrobed with a sugar slurry having the following formulation:

| Ingredients | Weight % |
| --- | --- |
| Sugar | 54.00 |
| Honey | 10.00 |
| Flavored syrup | 5.00 |
| Salt/spice, gums | 1.00 |
| Moisture | 30.00 |
| | 100.00% |

The sugar slurry coated cereal base pieces are then further enrobed with particulates such as dried apple pieces or "bits" (1 mm) to give a final enrobed piece of the following composition:

| Ingredients | Weight % |
| --- | --- |
| Puffed cereal base | 55.00 |
| Sugar slurry | 35.00 |
| Dried apple bits (1 mm) | 10.00 |
| | 100.00% |

The sugar and apple coated pieces are then passed through a predryer for about two minutes at 120° F. (49° C.) to surface dry the cereal piece.

The coated cereal base is then dried/toasted in a belt toaster for five to seven minutes at about 300° F. (150° C.) to form a sugar coated whole oat toasted puffed cereal piece of the present invention having a moisture content of about 2.5%.

The finished sugar coated pieces are vitamin fortified as described above in Example 1.

The finished R-T-E cereals are characterized by a thin external crust that is crispy and imparts a toasted grain flavor. An advantage of the present process is that a separate toasting step is not required.

EXAMPLE 3

A flake multigrain R-T-E cereal of the present invention having a sugar infused crust layer having a reaction flavor and an oil component is prepared having a cereal base having the following formulation:

| Base Formula | | |
| --- | --- | --- |
| Ingredients | Weight % | |
| Wheat (13% moisture) | 40.00 | |
| Corn (13% moisture) | 25.00 | |
| Sugar syrup | 35.00 | |
| Sugar | | 24.00 |
| Salt | | 5.00 |
| Corn syrup | | 5.00 |
| Trisodium phosphate | | 1.00 |
| | 100.00% | 35.00% |

The base formula is formed into a cooked cereal dough and then into wet flakes in a manner similar to the method described above in Example 1. The wet cereal flakes (18% moisture) are then ceased with a sugar slurry having the following formulation:

| Sugar Solution | |
| --- | --- |
| Ingredients | Weight % |
| Sucrose | 36.00 |
| Flavoring/flavored syrups | 13.00 |
| Water | 35.00 |
| | 100.00% |

The solution is applied to the wet flakes in a weight ratio of about 0.1:1, i.e., about 10 g of slurry per 100 g of wet flakes.

The sugar coated wet cereal flakes are dried, toasted and vitamin fortified as described above in Example 1.

The finished R-T-E cereals are characterized by a thin external crust layer that is crispy and imparts an improved toasted grain flavor.

By virtue of including the reaction flavor into the sugar coating solution and toasting the coated wet cereal flake, the reaction flavor complexes with the carbohydrates and proteins of the cereal composition during the toasting step. In consequence, a more complex, fuller flavor is developed compared to a simple drying step.

EXAMPLE 4

A flake multigrain R-T-E cereal of the present invention having a sugar infused crust layer is prepared having a cereal base having the following formulation:

| Wheat Flake | | |
|---|---|---|
| Ingredients | Weight % | |
| Wheat (13% moisture) | 35.00 | |
| Rice | 20.00 | |
| Corn | 10.00 | |
| Sugar syrup | 35.00 | |
| Sugar | | 24.00 |
| Salt | | 5.00 |
| Corn syrup | | 5.00 |
| Trisodium phosphate | | 1.00 |
| | 100.00% | 35.00% |

The base formula is formed into a cooked cereal dough and then into wet flakes in a manner similar to the method described above in Example 1. The wet cereal flakes (18% moisture) are then coated with a sugar slurry having the following formulation.

| Sugar Solution | |
|---|---|
| Ingredients | Weight % |
| Fructose | 18.00 |
| Non-fat dry milk | 10.00 |
| Sugar | 10.00 |
| Trisodium phosphate | 2.00 |
| Moisture | 60.00 |
| | 100.00% |

The solution is applied to the wet flakes in a weight ratio of about 24 g of slurry per 100 g of wet flakes.

The sugar coated wet cereal flakes are dried, toasted and vitamin fortified as described above in Example 1.

The finished R-T-E cereals are characterized by a thin external crust layer that is crispy and imparts an improved toasted grain flavor.

The sugar coating includes ingredients which react with the cereal composition during the high temperature toasting step forming and imparting a caramelized sweetened creamy flavor.

What is claimed is:

1. A method for providing a presweetened sugar coating to a cereal base in the form of a sugar coating to provide a finished sugar coated ready-to-eat cereal exhibiting greater crispness and extended bowl life, comprising the steps of:

a. applying a high moisture sugar slurry to a cereal base to form a slurry coated cereal base; wherein the sugar slurry has a moisture content of about 40% to 60% and wherein the ratio of sugar slurry (dry basis) to cereal base ranges from about 0.05:1 to about 0.50:1;

wherein the cereal base comprises a quantity of cereal pieces selected from the group consisting of untoasted flakes, shreds, biscuits, shredded biscuits, pellets in sheet form, filled biscuits, filled shredded biscuits and mixtures thereof, wherein the cereal base is wet and has a moisture content of about 12% to 20%, and wherein the sugar slurry additionally includes about 1% to 20% of a reaction flavor ingredient selected from the group consisting of non-fat dry milk solids, malt syrup and mixtures thereof.

b. drying the slurry coated cereal base piece to form the sugar coated R-T-E cereal having a moisture content of 1% to 6%, wherein the pieces obtain a surface temperature of >135° C. during at least a portion of the drying step.

2. The method of claim 1 wherein the drying step includes the substeps of 1. initial drying with forced hot air having a temperature of about 350° to 475° F. (150° to 250° C.) to an intermediate moisture of about 6% to 10%, and 2. final drying with forced hot air having a temperature of about 275° to 375° F., (135° to 190° C.) to a moisture content of 1% to 6%.

wherein the cereal base has a bulk density ranging from about 0.07 to 0.15 g/cc.

3. The method of claim 2 wherein the cereal base includes a wet flake having a thickness of about 350 to 600 µm.

4. The method of claim 3 wherein the cereal base comprises a whole wheat based cereal flake.

5. The method of claim 4 wherein the cereal base comprises a) about 40 to 90 wt % (dry weight) of the cereal base of whole wheat, b) about 0.1 to 40 wt % (dry weight) of supplemental cereal flour, c) about 0.1 to 20 wt % (dry weight) of wheat starch.

6. The method of claim 2 wherein the cereal base comprises spherical puffed cereal pieces.

7. The method of claim 1 additionally comprising applying particulate contemporaneously with the sugar slurry to the topical surface of the cereal base.

8. The method of claim 7 wherein the sugar slurry additionally comprises about 0.1% to 10% of a flavor ingredient.

9. The method of claim 1 wherein the cereal base is puffed and has a moisture content of about 1% to 7%.

* * * * *